Patented Nov. 26, 1935

2,022,001

UNITED STATES PATENT OFFICE 2,022,001

MOLDABLE COMPOSITION

Harold S. Holt, Wilmington, Del., assignor to E. I. du Pont de Nemours & Company, Wilmington, Del., a corporation of Delaware No Drawing. Original application July 6, 1933, Serial No. 679,219. Divided and this application August 30, 1934, Serial No. 742,175

6 Claims. (Cl. 106—22)

This invention relates to molding plastics, and more particularly, casein molding plastics.

This case is a division of application Serial Number 679,219, filed July 6, 1933, Patent No. 1,978,533 issued Oct. 30, 1934.

Casein plastics are usually prepared by extruding a casein mass moistened with about 20% of its weight of water through a heated screw press. The kneading action and the heat of the screw press convert the casein into a soft dough which is extruded in the form of rods, sheets or tubes. The material issuing from the screw press is cut into convenient sizes while soft, and the pieces are hardened by immersion in formaldehyde solution under carefully controlled conditions. This soaking may require periods varying from days to weeks in order to thoroughly insolubilize the casein. After formaldehyde treatment the product must age for a considerable period to allow the water to evaporate and the product to harden. During this aging period the plastic usually shrinks and warps and it is necessary to subject the material to heat and pressure to correct the distortions which result. The hardened plastic is stamped or cut into the desired shapes which are finished by polishing.

This invention has as an object the preparation of casein plastics which do not require formaldehyde treatment after molding. A further object is the preparation of casein plastics which are more homogeneous and more water resistant. A still further object is the preparation of molding powders comprising casein and polybasic acid polyhydric alcohol condensation products. Other objects will appear hereinafter.

These objects are accomplished by the following invention wherein aqueous solutions containing casein and polybasic acid polyhydric alcohol condensation products are precipitated by means of acids, the precipitate treated with formaldehyde, subsequently freed from acid, formaldehyde, and water, dried, powdered and the resulting powder molded, employing heat and pressure.

The polybasic acid polyhydric alcohol condensation products suitable for the purposes of the present invention are those soluble in aqueous alkaline solutions, precipitatable therefrom by acids, compatible with casein, and having thermo-plastic properties. The following example gives the composition and method of preparing a suitable resin.

Example 1

| | Parts |
|---|---|
| Phthalic anhydride | 53.94 |
| Glycerol | 22.82 |
| Castor oil | 23.24 |
| | 100.00 |

The above ingredients are mixed in an open kettle in the proportions shown and are heated to 392° F. in one hour. The temperature is maintained at 392° F. for approximately two hours or until an acid number of 100–120 is reached, after which heating is discontinued.

The resulting resin is rendered water-soluble by agitating with an aqueous solution of ammonia, sodium hydroxide, or other alkali, the amount of alkali required being determined by the acid number of the resin. An example of an aqueous solution of the above resin is given below.

Example 2

| | Parts |
|---|---|
| Resin from Example 1 (Acid No. 100) | 25 |
| Water | 75 |
| Ammonium hydroxide solution containing 28% NH$_3$ | 2.67 |
| | 102.67 |

This mixture is agitated for several hours until the resin dissolves to form a clear transparent solution. Gentle heating will hasten the solution process.

The water solution of resin described in Example 2 is next incorporated with casein in the following manner:

Example 3

Seventy-five parts of casein is mixed with 1000 parts of water and the mixture is warmed to 60° C. and allowed to stand for a short period of time to effect a soaking of the casein. Concentrated ammonia water (specific gravity 0.90) is then added until a persistent ammoniacal odor is obtained. Swelling of the casein begins immediately. The mixture is stirred to hasten the solution process. If the odor of ammonia disappears, more ammonia water is added and stirring is continued until a smooth dispersion free from lumps is obtained. To this dispersion is added 102.67 parts of the resin solution described under Example 2 and the mixture is stirred until homogeneous. The ratio of casein to resin in this solution is 3:1.

A molding power is prepared from this solution by the following process:

Example 4

The solution containing casein and resin described in Example 3 is diluted with water until its solids content has been reduced to about 5%. This solution is then precipitated with dilute (25%) hydrochloric acid solution, precipitation being effected by slowly adding the acid solution to the casein-resin solution while the latter is being vigorously agitated. The addition of acid causes a co-precipitation of casein and resin, the precipitate separating in a finely divided form which is easily handled. The amount of acid required to precipitate the casein-resin solution will vary depending on the amount of alkali used to dissolve the casein and the resin. Addition of acid is discontinued when no further precipitation occurs. The precipitate is allowed to settle and 200 grams of 37% formaldehyde solution is added to the slurry. The water slurry containing formaldehyde and precipitate is allowed to stand for 48 hours with occasional stirring after which time it is filtered. The filtered material is washed with water until free from formaldehyde and acid. This can be determined by testing the moist precipitate with blue litmus paper. When no change from blue to red occurs, the washing is complete. The washed material is then allowed to air-dry, after it is powdered to pass a 40 mesh screen and is then ready for molding. Molding conditions may be varied over a considerable range. A temperature of 95–120° C. and a pressure of 2500 pounds per square inch, both maintained for 15 minutes, have been found to be suitable.

The process as disclosed in Examples 3 and 4 is merely illustrative of the general procedure to be followed and the invention is not limited to the proportions of the ingredients given above. The ratio of casein to resin may be varied over a wide range depending on the physical properties of the resin which is used. Thus, from 1 to 9 parts of casein may be used per one part of resin. Below the lower limit of resin content there is not sufficient resin present to markedly affect the fusibility and water resistance of the casein. Above the upper limit of resin content the hardness and toughness of the plastic are markedly and adversely affected by the quantity of resin used. The length of time during which the precipitated casein-resin slurry is allowed to react with formaldehyde may vary from sixteen hours to two weeks. Plastics having greatest water resistance and ease of molding are obtained from slurries which have been treated with formaldehyde for about forty-eight hours. The longer the formaldehyde treatment of the precipitate the higher the temperature required to mold the plastic matter formed. In addition, it has been found that precipitates which have been treated for long periods of time give plastics having poor water resistance, due to the fact that they do not completely fuse on molding. The ratio of formaldehyde to casein may also be varied and is by no means limited to the ratio given in Example 4. Other acids than hydrochloric may be used as precipitants, although hydrochloric acid is preferred to sulfuric acid, nitric acid, etc.

Dyes, pigments, fillers, and the like, may be incorporated in these molding powders if desired. Incorporation may be effected by dispersing these materials in the aqueous alkaline solution of casein or in the aqueous alkaline solution of resin. Such dispersion may be effected by any suitable means such as grinding in a ball mill or by simple mixing.

The term "casein" applies to casein of any variety such as rennet, naturally soured, or acid precipitated casein. The term also includes thermoplastic proteinous materials such as blood and egg albumen. The term "polybasic acid-polyhydric alcohol condensation product" includes any representative of this class of resins soluble in aqueous alkaline solutions, and compatible with casein. These condensation products may contain such polybasic acids as phthalic, succinic, adipic, fumaric, maleic, methyladipic, or sebacic acid, or their derivatives or substitution products. Polyhydric alcohols which may be condensed with the above or similar polybasic acids include glycerol, polyglycerols, ethylene glycol, diethylene glycol, triethylene glycol, pentaerythritol, and the like. Modifying agents such as China wood, linseed, or other drying oils, cottonseed, olive, and other non-drying oils, as well as rosin, stearic, hydroxystearic and other high molecular weight monobasic acids may be incorporated with these resins to obtain special properties. Thus the incorporation of castor oil or rosin improves compatibility of the resin with casein while the incorporation of stearic acid improves the water resistance of the plastic. It has been found that best results are obtained with resins from phthalic, succinic, or adipic acid with glycerol, glycol or diethylene glycol when modified with castor oil to the extent of 10–50%.

Casein plastics prepared according to the process described herein have a number of very desirable properties as compared with casein plastics of the prior art. One defect of casein plastics, prepared by extrusion and subsequent hardening with formaldehyde, is their moisture sensitivity which leads to warping and softening. In addition, they cannot be reversibly hardened and cannot be molded in dies as a molding powder, which limits the number of articles which can be made from them. A tendency to craze and to develop brittleness is also noticeable in prior art casein plastics. A process difficulty is the tying up of large stocks of goods for long periods of time because of the long formaldehyde treatment and subsequent aging necessary to harden ordinary casein plastics. On the other hand, the polybasic acid polyhydric alcohol condensation product casein plastics of the present invention can be molded after the formaldehyde treatment and since there is no water present there is no evaporation and consequently no shrinkage after molding. In addition, the presence of the resins in the product prevents the development of crazing and increases the water resistance of the plastic. Since the modified polyhydric alcohol-polybasic acid resins act as holding agents it is possible to utilize casein products containing them as molding powders which can be molded in a die in any desired shape. Plastics prepared according to the process of this invention are hard, non-crazing, non-shrinking, and have better water resistance than commercial casein plastics now on the market. This is illustrated by the following data which show the amount of water absorbed after 92½ hours immersion by
(a) Plastic containing casein and polyhydric alcohol-polybasic acid condensation product prepared according to the process disclosed herein,
(b) Plastic containing only casein prepared according to the process herein disclosed,
(c) Commercial casein plastic hardened by formaldehyde treatment after molding.

| Plastic | Percent water absorbed |
|---|---|
| (a) | 9.8 |
| (b) | 30.7 |
| (c) | 12.1 |

The process by which the molding powders disclosed herein are manufactured is simple in comparison with the process now in use for the manufacture of casein plastics, since the long formaldehyde soaking treatment and subsequent aging process are both avoided.

Molded products prepared using the process of the present invention have increased transparency when compared with the products of the prior art.

As many apparently widely different embodiments of this invention may be made without departing from the spirit and scope thereof, it is to be understood that I do not limit myself to the specific embodiments thereof except as defined in the appended claims.

I claim:
1. A molding composition comprising a thermoplastic substantially water insensitive formaldehyde treated mixture of casein with a polycarboxylic acid-polyhydric alcohol condensation product.
2. A molding composition comprising a thermoplastic substantially water insensitive formaldehyde treated mixture of casein with a high molecular weight monobasic acid modified polycarboxylic acid-polyhydric alcohol condensation product.
3. A molding composition comprising a thermoplastic substantially water insensitive formaldehyde treated mixture of casein with a high molecular weight fatty acid modified polycarboxylic acid-polyhydric alcohol condensation product.
4. A molding composition comprising a thermoplastic substantially water insensitive formaldehyde treated mixture of casein with an oil modified polycarboxylic acid-polyhydric alcohol condensation product.
5. A molding composition comprising a thermoplastic substantially water insensitive formaldehyde treated mixture of casein with a castor oil modified polycarboxylic acid-polyhydric alcohol condensation product.
6. A molding composition comprising a thermoplastic substantially water insensitive formaldehyde treated mixture of casein with glycerol-phthalic anhydride-castor oil resin.

HAROLD S. HOLT.